Sept. 27, 1938.  G. D. JOHNSON ET AL  2,131,400
SLIP
Filed July 21, 1936  2 Sheets-Sheet 1
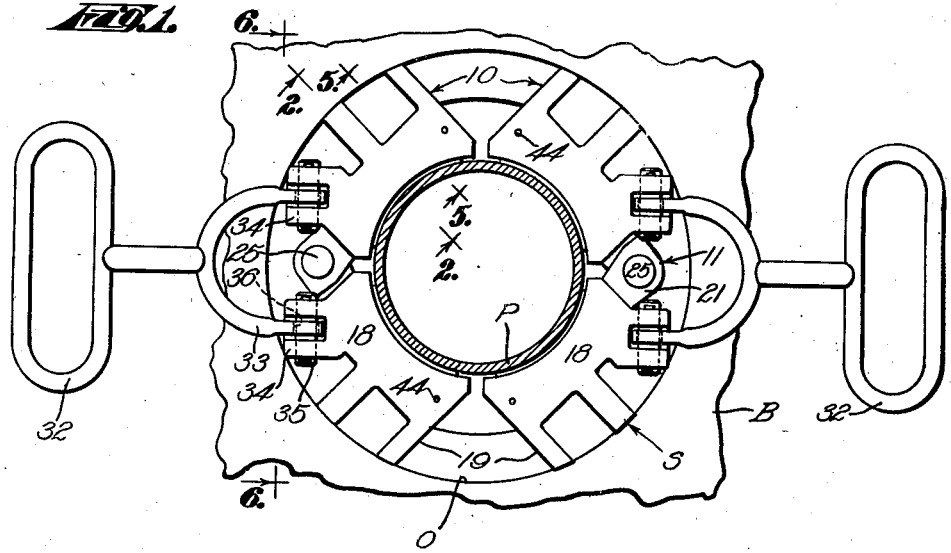
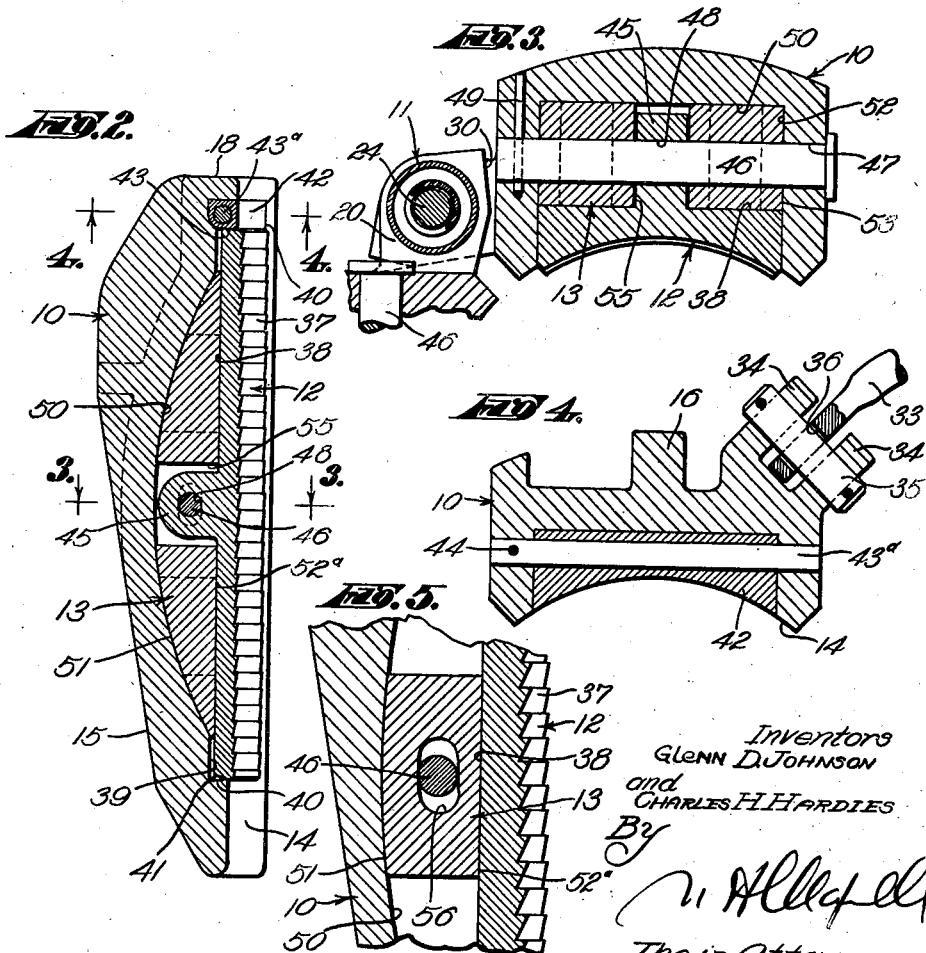
Inventors
Glenn D. Johnson
and
Charles H. Hardies
Their Attorney

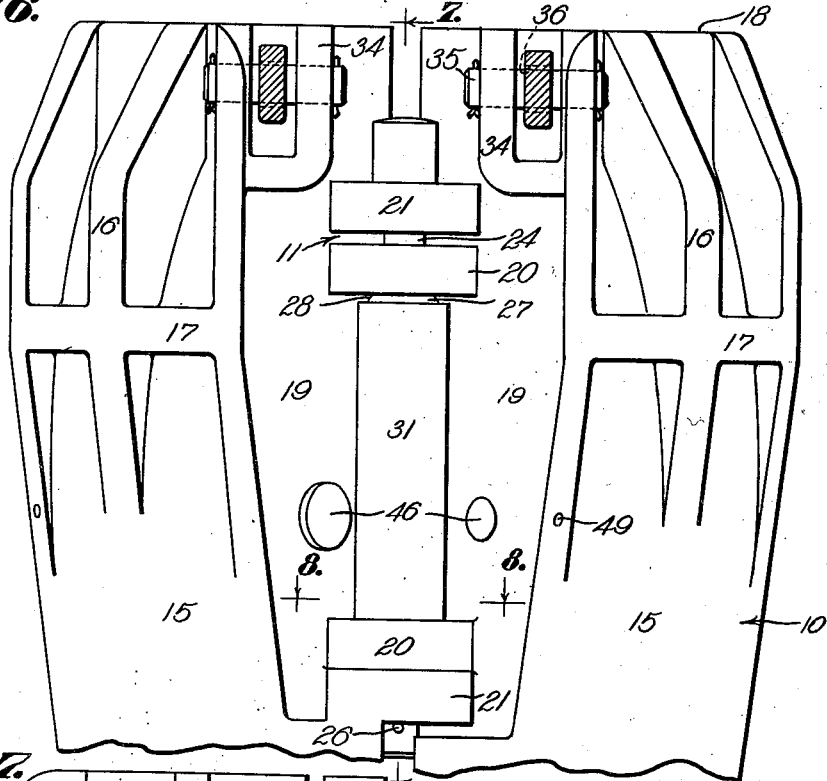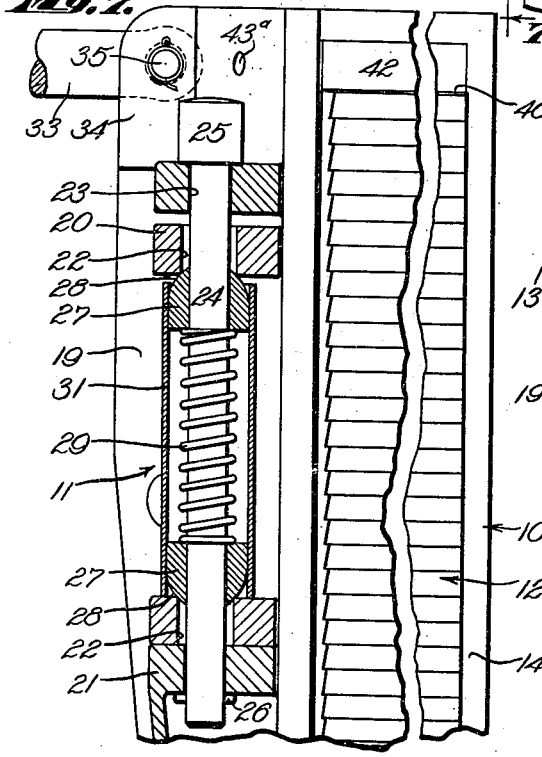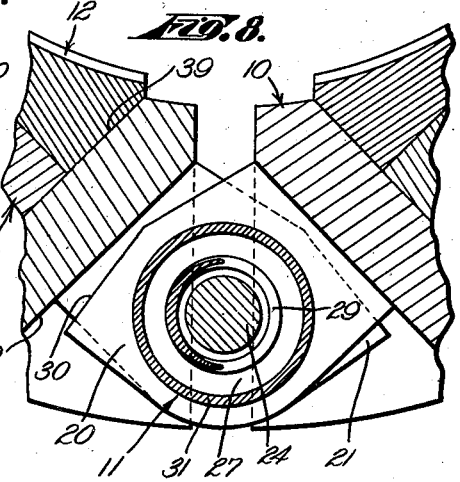

Patented Sept. 27, 1938

2,131,400

UNITED STATES PATENT OFFICE 2,131,400

SLIP

Glenn D. Johnson and Charles H. Hardies, Los Angeles, Calif., assignors to Baash-Ross Tool Company, Los Angeles, Calif., a corporation of California Application July 21, 1936, Serial No. 91,674

19 Claims. (Cl. 24—263)

This invention has to do with well drilling apparatus and has particular reference to slips for use in the rotary table of a well drilling rig. A general object of this invention is to provide improved, particularly effective gripping slips of the character referred to.

Another object of this invention is to provide slips for use in a rotary table that embody object or pipe gripping elements which automatically conform to and obtain full gripping engagement with the object or pipe.

Another object of this invention is to provide slips of the character mentioned embodying shiftable gripping elements and simple, effective means for automatically rocking or shifting the elements into full balanced engagement with the pipe or object.

Another object of this invention is to provide slips of the character mentioned embodying rockers or equalizers shiftable on surfaces of the slip bodies to bring the pipe gripping elements into full equalized engagement with the pipe or object irrespective of the points of initial contact of the gripping elements with the pipe or object.

Another object of this invention is to provide slips of the character mentioned in which the pipe gripping elements are brought into full equalized engagement with the object or pipe without moving vertically relative to the slip bodies or the pipe whereby they may obtain proper extensive engagement with the pipe.

Another object of this invention is to provide slips of the character mentioned that each embody body sections connected by improved hinge means that allow the individual body sections to rock and shift with respect to one another to conform to and properly seat in the rotary table bushing.

Another object of this invention is to provide improved slips of the character mentioned that are easy and convenient to handle and manipulate.

The various objects and features of our invention will be fully understood from the following detailed description of a typical preferred form and application of our invention, throughout which description reference is made to the accompanying drawings, in which:

Fig. 1 is a top or plan view of a portion of a rotary table bushing illustrating a set of slips of the present invention seated therein to engage about a pipe. Fig. 2 is an enlarged longitudinal detailed sectional view of one of the slip sections being a view taken as indicated by line 2—2 on Fig. 1. Fig. 3 is an enlarged fragmentary transverse detailed sectional view taken substantially as indicated by line 3—3 on Fig. 2. Fig. 4 is an enlarged fragmentary transverse detailed sectional view taken as indicated by line 4—4 on Fig. 2. Fig. 5 is an enlarged fragmentary vertical sectional view taken in the plane indicated by line 5—5 on Fig. 1. Fig. 6 is an enlarged fragmentary elevation of the outer side of one of the slips with the handle in vertical section, being a view taken substantially as indicated by line 6—6 on Fig. 1. Fig. 7 is a vertical detailed sectional view taken as indicated by line 7—7 on Fig. 6, and Fig. 8 is a fragmentary transverse detailed sectional view taken as indicated by line 8—8 on Fig. 6.

The features of the present invention are adapted to be embodied in slips varying somewhat in construction and in sets of separate or individual slips. In the following detailed disclosure we will describe a typical form of the invention comprising a set of two slips S each slip comprising two slip units or sections connected for relative movement. It is to be understood that the invention is not to be construed as limited or restricted to the specific embodiment about to be described but that it is to be taken as including any features or modifications that may fall within the scope of the claims. As the two slips S illustrated may be identical, we will proceed with a detailed description of one slip S, it being understood that such description is equally applicable to the other slip.

The improved slip S provided by the present invention includes, generally, two slip body sections 10, means 11 hingedly connecting the sections 10, shiftable pipe engaging elements 12 at the inner sides of the body sections 10 and rockers or equalizers 13 between the body sections 10 and the elements 12 to effect the proper engagement of the elements with the object or pipe to be handled.

The slip body sections 10 are adapted to be inserted in the opening O of a rotary table bushing B to bring the elements 12 into gripping and supporting contact with a pipe P extending through the bushing B. The body sections 10 of the slip may be simple integral members and may be alike or complementary in shape. In accordance with the invention the body sections 10 are vertically elongated members having vertical cylindrically concaved inner surfaces 14 for receiving or fitting about the pipe P with suitable clearance. The outer or rear surfaces 15 of the sections 10 are transversely or horizontally convexed and are tapered downwardly and inwardly to seat on the wall of the tapered bushing opening O. The lower outer corners of the sections 10 may be tapered or bevelled away to facilitate the introduction of the slip in the opening O. The upper outer portions of the body sections 10 may be cored or of skeleton formation to reduce the weight of the slips. In the case illustrated in the drawings the upper outer portions of the body sections 10 comprise longitudinally extending ribs 16 connected by transverse ribs 17. The upper ends 18 of the body sections 10 may be flat and horizontal. Each body section 10 may have flat vertical and substantially parallel sides 19 whereby the adjacent or opposing sides 19 of the sections 10 have substantial clearance and whereby the weight of the slips is reduced. The body sections are related so that their adjacent or opposing sides 19 are outwardly or rearwardly divergent.

The means 11 for connecting the body sections 10 is such that the sections 10 may independently shift to properly seat in the bushing opening O. The means 11 is in the nature of a hinge connection and includes spaced lugs or ears 20 on one section 10 and spaced ears 21 on the other section 10. The ears 20 and 21 are located to be in sets or pairs as illustrated in Figs. 6 and 7 of the drawings. In the particular case illustrated the ears 20 are located at the inner sides of the spaced ears 21. Vertical openings 22 are provided in the ears 20 and vertical openings 23 are provided in the ears 21 in alignment with the openings 22. The openings 22 are preferably larger in diameter than the openings 23. A hinge pin 24 is arranged vertically through the sets of aligned openings 22 and 23. A head 25 is provided on one end of the pin 24 and a retaining key or pin 26 is provided on the other end part of the pin 24 to prevent axial displacement of the pin. The pin 24 passing through the openings 22 and 23 connects the two body sections 10 for relative pivotal movement about a substantially vertical axis. The hinge pin 24 passes through the openings 22 with substantial clearance whereby the body sections 10 may rock or tilt relative to one another.

The invention provides means for controlling the relative lateral movement and rocking movement of the two body sections 10. Axially shiftable sleeves 27 surround the hinge pin 24 and have spherically curved surfaces 28 cooperating with or partially entering the openings 22 at the opposing sides of the ears 20. A spring 29 surrounds the hinge pin 24 and is arranged under compression between the sleeves 27. The spring 29 maintains the surfaces 28 in cooperation with the ears 20 at the opposing ends of the openings 22 to yieldingly resist relative lateral shifting and rocking of the body sections 10. When there is a pronounced tendency for the body sections 10 to rock or tilt relative to one another or to shift laterally relative to one another the cooperation of the surfaces 28 with the ears 20 may cause the spring 29 to yield whereby the sleeves 27 shift along the pin 24 as the sections 10 shift relative to one another. In this manner the connecting means 11 between the two sections 10 resists relative lateral movement and tilting of the sections 10 but allows such movement to permit the sections 10 to conform to the opening O in the bushing B as the slips engage about the pipe P. The extent of relative lateral shifting and rocking of the slip sections 10 is limited by the amount of clearance of the pin 24 in the openings 22. The sections 10 are, of course, free to pivot or hinge on the pin 24 whereby they may readily seat in the bushing opening O. Stop faces 30 are provided on the ears 20 and 21 to cooperate with the adjacent side surfaces 19 of the sections 10 to limit relative pivoting of the sections. The means 11 may include a protective tube 31 surrounding and enclosing the spring 29 and the sleeves 27.

The slip S is preferably provided with a handle 32 whereby it may be conveniently lifted and manipulated. The particular handle 32 illustrated in the drawings has a suitable loop or head at its outer end for engagement by the operators and is provided at its inner end with spaced arms 33. The inner ends of the arms 33 are received between spaced lugs 34 on the adjacent rear corners of the body sections 10. Pins 35 are carried by and extend between the lugs 34 and pass through openings 36 in the handle arms 33 to pivotally secure the handle 32 to the two body sections 10. The arms 33 are received between the lugs 34 with substantial clearance and the pins 35 pass through the openings 36 with substantial clearance. The clearance at these points allows the relative lateral shifting and tilting of the body sections 10 as the slip S is seated in the opening O to engage about the pipe P.

The elements 12 are the pipe or object engaging parts of the slip and an element 12 is provided on each body section 10. The elements 12 are longitudinally or substantially vertically disposed at the inner or active sides of the slip body sections 10. In practice the elements 12 are plate-like parts and may be substantially rectangular in front or face elevation. The active inner sides of the elements 12 are cylindrically concaved to conform to the pipe P and are provided with wickers or teeth 37. The teeth 37 may extend horizontally or circumferentially and face upwardly and inwardly to dependably grip and support the pipe P. In accordance with the invention the outer or rear surfaces 38 of the elements 12 are flat and are substantially vertical when the elements are in their normal positions. The gripping elements 12 are preferably proportioned so that their upper, lower and side edges are spaced within or inwardly from the adjacent edges of the body sections 10. The sections 10 are relieved or recessed to receive or partially receive the pipe engaging elements 12. Recesses 39 corresponding in shape to the elements 12 are provided in the inner sides 14 of the sections 10 to receive the elements. The rear walls of the recesses 39 may be flat and vertical and are spaced from the rear sides 38 of the elements 12 so that they are not normally contacted by the elements.

The upper and lower ends 40 of the pipe engaging elements 12 are preferably curved about horizontal axes spaced rearwardly or outwardly from the elements so that they converge forwardly or inwardly. The lower walls 41 of the recesses 39 are correspondingly curved and are shiftably engaged by the lower ends of the elements 12. Keepers or retaining bars 42 are arranged in the upper portions of the recesses 39. The bars 42 are arranged in place after the positioning of the elements 12 and together with the walls 41 assist in retaining the elements in position. The bars 42 fit against the upper and rear walls of the recesses 39 and their forward or inner faces may be concaved and flush with the inner sides 14 of the sections 10. The lower surfaces 43 of the bars 42 have the same curvature as the upper ends of the elements 12 and are shiftably engaged thereby. The lower walls 41 of the recesses 39 and the lower surfaces 43 of the bars 42 cooperate with the ends 40 of the elements 12 to prevent vertical shifting of the elements 12 relative to the sections 10 and to assist in preventing inward loss or displacement of the elements from the recesses 39. The keepers or bars 42 may be formed of relatively hard rubber or the like to prevent dirt from entering behind the equalizers 13 and to assist in retaining the equalizers in the proper cooperation with the other parts. The bars 42 are locked or secured to the body sections 10. In the particular case illustrated in the drawings retaining pins 43a are arranged through aligned horizontal openings in the sections 10 and the bars 42 to removably secure the bars in place. The securing pins 43a may be locked against displacement by pins 44 arranged in vertical openings in the body sections 10 and the pins 43a.

The invention preferably includes means for positively preventing bodily vertical shifting of the elements 12 and inward loss or displacement of the elements. A central lug 45 is provided on the rear side 38 of each element 12. The lugs 45 preferably have flat vertical sides. Substantially horizontal pins 46 are carried in openings 47 in the body sections 10 and pass through openings 48 in the lugs 45. The pins 46 cooperate with the openings 48 to positively prevent loss of the elements 12 and undesired vertical movement of the elements. The openings 48 preferably receive the pins 46 with sufficient clearance to allow the desired movement of the elements 12. Dowels or pins 49 may be arranged through openings in the body sections 10 and the retaining pins 46 to hold the pins 46 against displacement. The elements 12 supported or arranged as just described are substantially vertically disposed at the inner sides of the body sections 10 and are positioned to have their teeth 37 project beyond the inner surfaces 14 of the sections 10 to contact the pipe P.

The rockers or equalizers 13 are interposed between the rear surfaces 38 of the elements 12 and the body sections 10 to effect automatic alignment and full contact of the elements 12 with the pipe P when the slip S is arranged in the opening O about the pipe P. In accordance with the invention the equalizers 13 move vertically on surfaces 50 of the body sections 10 to rock or tilt the elements 12. In the preferred construction illustrated the equalizers 13 are segmental in side elevation having cylindrically convexed rear surfaces 51 and flat forward or inner surfaces 52a which are chords of the curved surfaces 51. The convex surfaces 51 of the equalizers 13 are preferably curved about horizontal axes and may be cylindrically curved as illustrated. The surfaces 51 are preferably of substantial extent and have a relatively long radius of curvature. In practice the curved surfaces 51 may extend between the upper and lower ends of the equalizers 13.

The surfaces 50 are provided on the body sections 10 to receive and cooperate with the surfaces 51 of the equalizers 13. The surfaces 50 face inwardly relative to the longitudinal axis of the opening O and are concaved or curved to correspond to and cooperate with the surfaces 51. It will be observed that the provision of the surfaces 50 requires the forming of sockets or cavities 52 in the body sections 10 to receive or house the equalizers 13. The cavities 52 extend outwardly or rearwardly from the rear wall of the recesses 39. The opposite sides 53 of the equalizers 13 may be flat and vertical and the opposing or adjacent walls of the cavities 52 may likewise be flat and vertical. It is to be understood that while we have shown the equalizers 13 provided with convex surfaces 51 to cooperate with concave body surfaces 50, the invention contemplates the provision of concave surfaces on the equalizers 15 for cooperating with convex surfaces on the body sections 10.

The parts are proportioned and related so that the surfaces 51 of the equalizers 13 shiftably bear on the concave body surfaces 50 while the inner surfaces 38 of the elements 12 bear on the surfaces 52a of the equalizers. The equalizers 13 are free to shift along the body surfaces 50 under the influence of force transmitted through them between the elements 12 and the body sections 10. The equalizers 13 shifting vertically along the surfaces 50 by the force resulting from the engagement of the elements 12 with the pipe P operate to tilt or rock the elements 12 to bring them into full equalized engagement with the pipe whereby the gripping and supporting forces are distributed throughout the lengths of the elements. Horizontal openings 55 are provided in the equalizers 13 to receive the lugs 45 with substantial clearance. Elongate or arcuate slots 56 are provided in the equalizers 13 to receive the pins 46. The openings 55 and the slots 56 respectively receive the lugs 45 and the pins 46 with sufficient clearance to permit the desired shifting of the equalizers 13 along the body surfaces 50. It will be noted that the pins 46 connect the body sections 10, the elements 12 and the equalizers 13 together to have the desired relative movement.

In employing the slips of the present invention the slips S may be individually lifted and handled by means of their handles 32. When it is desired to grip or support the pipe P passing through the opening O, the slips S are inserted downwardly in the opening to engage about the pipe P. The inclined outer surfaces 15 of the body sections 10 cooperate with the inclined wall of the opening O to urge the elements 12 inwardly against the pipe P. As described above, the means 11 connect the sections 10 of the slips S for relative pivotal movement and for limited relative lateral movement and rocking so that the sections 10 may properly conform to and seat on the wall of the opening O. As the slips S move downwardly in the opening O the elements 12 come into engagement with the pipe P. The elements 12 may each have limited initial engagement with the pipe P and this engagement results in the application of forces to the equalizers 13. In the event that an element 12 has only partial or limited engagement with the pipe P the forces resulting from this engagement are transmitted through the equalizer 13 and result in shifting or moving of the equalizer along the body surface 50. The equalizer 13 moving along the surface 50 and engaging the surface 38 of the element 12 shifts or tilts the element as it moves. This movement of the equalizer 13 brings the element 12 into alignment with the pipe P so that its teeth 37 may all grip the pipe. The equalizer 13 in the case just mentioned will shift along the surface 50 until the forces acting upon it are balanced at which time the element 12 will be in full cooperation with the pipe P. The element 12 may properly conform to the pipe while the equalizers may independently properly conform to the body section 10. The several equalizers 13 of course operate independently to effect the balanced and full engagement of the elements 12 with the pipe P.

It will be observed that the elements 12 are aligned and brought into complete engagement with the pipe P without vertical shifting relative to either the pipe P or the body sections 10. Accordingly, the teeth 37 almost immediately obtain proper and full gripping engagement with the pipe. The equalizers 13 operate entirely automatically to position and align the gripping elements 12 with the pipe P to assure the dependable and proper engagement of the elements with the pipe. The slips of the present invention embodying the shiftable gripping elements 12 and the equalizers 13 are particularly effective and dependable in operation. Further, the slips S are simple to manufacture and are convenient to handle and manipulate.

Having described only a typical preferred form and application of the invention, we do not wish to be limited or restricted to the specific details herein set forth, but wish to reserve to ourselves any variations or modifications that may appear to those skilled in the art or fall within the scope of the following claims.

Having described our invention, we claim:

1. A slip for use in the tapered opening of a rotary table including, a body, the body having an inclined outer surface for cooperating with the wall of said opening to transmit forces between the body and the table and to urge the body inwardly toward the object to be gripped, a shiftable gripping element at the inner side of the body, and an equalizer interposed between the body and gripping element and shiftably cooperating with both the body and element to shift the element into full contact with the object being gripped.

2. A slip for use in the tapered opening of a rotary table including, a body, an inclined outer surface on the body cooperable with the wall of said opening to transmit forces between the body and the table, a tiltable gripping element at the inner side of the body for gripping an object extending through the opening, and a rocker bearing between the body and the element and shiftably cooperating with both the body and element to tilt the element into full contact with the object being gripped.

3. A slip for gripping an object extending through the tapered opening of a rotary table including, a body, an inclined outer surface on the body adapted to substantially conform to the wall of said opening, a tiltable gripping element at the inner side of the body for gripping said object, means for directly transmitting vertical forces from the element to the body, and a rocker bearing between the body and the element and shiftably cooperating with both the body and element to tilt the element into full conformity with the object to be gripped.

4. A slip for gripping an object extending through the tapered opening of a rotary table including, a wedge-like body having an inclined outer surface for conforming to the wall of said opening, a shiftable gripping element at the inner side of the body, and a segmental equalizer shiftably bearing on opposing surfaces of the body and gripping element to bring the element into full engagement with the said object when it contacts the same.

5. A slip for gripping an object extending through the tapered opening of a rotary table including, a body having a curved inwardly facing surface and an inclined outer surface for cooperating with the wall of said opening, a tiltable gripping element at the inner side of the body spaced from said surface, and an equalizer shiftably engaging said curved surface and shiftably cooperating with the element to bring the element into conformity with the said object.

6. A slip for gripping an object extending through the tapered opening of a rotary table including, a body having a surface inclined downwardly and inwardly with respect to the central axis of said opening to conform to the wall of the opening, a gripping element at the inner side of the body, means retaining the element on the body for tilting movement about a substantially horizontal axis, and a shiftable equalizer interposed between and shiftably engaging opposing surfaces of the body and element to tilt the element into balanced engagement with the said object.

7. A slip for gripping an object extending through the tapered opening of a rotary table including, a body, an inclined surface on the body for cooperating with the wall of said opening to support the body in the opening, a gripping element at the inner side of the body, means retaining the element for tilting movement and operable to transmit vertical forces from the element to the body, and a vertically shiftable equalizer shiftably bearing against opposing surfaces of the body and element to tilt the element into full engagement with the said object.

8. A slip for gripping an object extending through the tapered opening of a rotary table including, a body, an inclined surface on the body cooperating with the wall of the tapered opening, a rocking gripping element at the inner side of the body bearing on the body for the transmission of vertical forces thereto, a concave surface on the body spaced outwardly from the element, and an equalizer between the body and element having a surface shiftably cooperating with the element and having a convex surface shiftably bearing on the said concave surface.

9. A slip for gripping an object extending through the tapered opening of a rotary table including, a body, an inclined outer surface on the body for bearing on the wall of said opening, a curved surface at the inner side of the body, a rocker having a curved surface shiftable on the curved surface of the body, and a tiltable gripping element shiftably bearing on the rocker to be tilted thereby into full engagement with the said object.

10. A slip for gripping an object extending through the tapered opening of a rotary table including, a body, an inclined outer surface on the body for bearing on the wall of said opening, an elongate vertically extending gripping element at the inner side of the body, means on the body tiltably carrying the element for the transmission of vertical forces to the body, and a segmental rocker shiftably cooperating with opposing surfaces of the body and gripping element to tilt the element into full cooperation with the object to be gripped.

11. A slip for gripping an object extending through the tapered opening of a rotary table including a body, an inclined outer surface on the body for bearing on the wall of said opening, a gripping element at the inner side of the body having an active forward face for gripping the said object and having a flat rear face, a concave face on the body opposing the element, and a segmental equalizer bearing between the body and the element, and having its flat chordal face shiftably cooperating with the rear face of the element and its convex face shiftably cooperating with the concave face.

12. A slip for gripping an object extending through the tapered opening of a rotary table including, a body, the body having an inclined outer surface for substantially conforming to the wall of said opening and an inner surface curved about a substantially horizontal axis, a gripping element, means supporting the element on the body for tilting about a substantially horizontal axis, and a rocker interposed between the body and element and having a curved surface vertically shiftable on the curved surface of the body and having a surface shiftably cooperating with the gripping element to tilt the gripping element into full cooperation with the said object.

13. A slip for gripping an object extending through the tapered opening of a rotary table including, two body sections each having an inclined outer surface for seating on the wall of said opening, means connecting the sections for relative shifting, a tiltable gripping element at the inner side of each section for gripping said object, and equalizers between opposing surfaces of the sections and elements and shiftable with respect to the sections and their gripping elements to tilt the elements in even contact with the object.

14. A slip for gripping an object extending through the tapered opening of a rotary table including, two body sections each having an inclined outer surface for seating on the wall of said opening, means connecting the sections for relative pivoting, tilting and vertical shifting, a gripping element at the inner side of each section for gripping said object, means associating each gripping element with its respective section for tilting movement about a substantially horizontal axis and equalizers shiftably cooperating with the sections and their respective elements for tilting the elements into full engagement with the said object.

15. A slip for gripping an object in the tapered opening of a rotary table including, a body section having a recess in its inner side, and a cavity extending outwardly from the recess, an inclined outer surface on the body for shiftably seating in said opening, a gripping element in the recess for gripping said object, means retaining the element on the body section for tilting movement about a substantially horizontal axis relative to the body section, and a rocker shiftable in the cavity and shiftably cooperating with the gripping element to tilt the same.

16. A slip including, two body sections, means on each of the sections for engaging a pipe, spaced parts on the sections having aligned openings, a pin passing through said openings to hingedly connect the sections, the pin having clearance with the walls of said openings in the parts on one of the sections whereby the sections may have limited relative lateral movement when the pin is in said openings, and means yieldingly resisting such relative lateral movement.

17. A slip of the character described including, two body sections, means on each of the sections for engaging a pipe, spaced parts on the sections having aligned openings, a pin passing through said openings to hingedly connect the sections, the pin having clearance in said openings in the parts on one of the sections whereby the sections may have limited relative lateral movement when the pin is in said openings, and means yieldingly resisting such relative lateral movement.

18. A slip of the character described including, two body sections, means on each of the sections for engaging a pipe, spaced parts on the sections having aligned openings, a pin passing through said openings to hingedly connect the sections, the pin having clearance with the walls of certain of said openings whereby the sections may have limited relative lateral movement, and means yieldingly resisting such relative lateral movement, the last mentioned means including shiftable spring urged members cooperating with said certain openings.

19. A slip for use in the tapered opening of a rotary table to grip an object therein, the slip including, a body for arrangement in the opening, an outer surface on the body inclined downwardly and inwardly with respect to the vertical axis of said opening to seat on its wall, a rockable gripping element at the inner side of the body for gripping the said object to support the same, the body and gripping element having spaced opposing surfaces, means for transmitting the vertical forces from the element to the body so that such forces do not tend to rock the element with respect to the body, and a member arranged between and shiftably cooperating with said opposing surfaces for the transmission of lateral forces between the body and element and for rocking the element into even engagement with the object.

GLENN D. JOHNSON.
CHARLES H. HARDIES.